Nov. 18, 1930.    A. F. VICTOR    1,781,937
FILM SPROCKET STRUCTURE
Filed July 18, 1929

Inventor-
Alexander Ferdinand Victor
Thomason & Lundy
Attys

Patented Nov. 18, 1930

1,781,937

UNITED STATES PATENT OFFICE

ALEXANDER FERDINAND VICTOR, OF NEW YORK, N. Y.

FILM SPROCKET STRUCTURE

Application filed July 18, 1929. Serial No. 379,303.

My present invention relates to devices for supporting and controlling the movement of the strip of film used in cinematographic apparatus such as motion-picture cameras, projectors, printing-machines, and the like, and said invention has more particular reference to a sprocket structure that has one part with teeth that enter perforations in a margin of the film to move the latter and has another co-acting part that supports the opposite longitudinal edge of the film to act as a guide therefor.

One of the objects of this improvement is to provide a structure of the character above-mentioned that is adapted to engage the perforations upon a single edge of the film for the purpose of moving said film and has separate means that will engage the opposite marginal edge of the film solely for the purpose of supporting and guiding the same. This is done by providing a sprocket structure with a single toothed flange or hub of the conventional type and in conjunction with which there is employed a flanged collar or sleeve upon which the opposite margin of the film is supported and guided. This materially reduces the cost of production and assembly of the apparatus and provides a structure that is extremely simple for an amateur operator to manipulate when loading or threading the film into a camera or projector. Further objects of the invention reside in the provision of a film sprocket device that is novel in construction, simple and dependable in operation, and which will not easily get out of order.

I prefer to carry out my invention and to accomplish the numerous objects thereof in substantially the manner hereinafter fully described and as more particularly pointed out in the claims, reference being herein made to the accompanying drawings that form a portion of this specification.

In the drawings:

Figure 1 is a view of my improved film sprocket structure shown in elevation and drawn to an enlarged scale.

Figure 2 is a longitudinal axial section of the device taken on line 2—2 of Figure 1, and looking downwardly in the direction of the arrows.

Figure 3 is a transverse section thereof taken on line 3—3 of Figure 2 and looking to the left in the direction of the arrows.

The drawings are in a sense merely schematic for the purpose of illustrating a typical or preferred structure, and in said drawings the same reference characters have been employed to designate like parts wherever they appear throughout the several views.

In said drawings there is shown a suitable wall partition, or other support 5 on which the sprocket structure is mounted. A stub or other embossment 6 projects laterally from the element 5 and is axially bored to provide a bearing for the sprocket spindle 7 that rotates therein and which is provided with a pulley 8 or other means upon one extended end by which the spindle is rotated. The opposite extended end of the spindle has a single sprocket flange or cylindrical body 9 secured to it in a removable manner by means of the set-screw or lock-bolt 10 that is screwed into a tapped bore 11 that extends transaxially into the body or flange from the circumference there as shown in Figure 2. The flange is circular or disk-shaped and upon the circumference thereof there is a plurality of sprocket teeth 12 that are equidistantly spaced in a single circumferential row and of such dimensions that they will fit the perforation in the margin of the film. The film is of the usual ribbon type as indicated schematically at 13 in the drawings and the perforations, which are indicated at 14 thereon, may be upon either or both longitudinal margins of the film. With the structure above described the adjacent edge of the film will be supported upon the circumference of the body or flange 9 and the rotation thereof will move the film in the manner desired.

The opposite longitudinal edge or margin of the film is supported upon a suitable element that is mounted at the inner end of the stub 6 farthest from the body 9 so that the intermediate portion of the film will be suspended between said element and the circumference of the body or flange 9 which will prevent marring or scratching the picture-bearing portion of the film. This support I have illustrated as an annulus in the form of a collar or sleeve 15 that is fitted onto the stub at preferably the junction formed by said stub with the support or wall 5. The collar or sleeve 15 may be either loose upon the stub or it may be mounted stationary on the latter by a driven fit thereon. Said collar or sleeve 15 is preferably fabricated in brass or other metal that will take or retain a smooth finish, and it is provided with an annular lateral flange 16 next the element 5 so that the transverse surface thereof will afford a guide for the margin of the film adjacent to or contacting the same. Thus the film is supported and guided upon both of its longitudinal marginal portions, with its intermediate portion unsupported and one of the parts of the structure will move the film in the manner and at the speed desired regardless of whether the other part of the structure is movable.

From the foregoing it will be seen that I have provided a very simply constructed support and control device for the film used in cinematographic apparatus, and with said device the film may be readily mounted upon the same. This device is especially adapted for use in connection with cameras and projectors of the types used by amateurs which employ a film of small dimensions and the apparatus is of restricted proportions because of its compact size thereby requiring small operating parts with which it is frequently difficult to associate the film. While I have herein disclosed a specific manner of carrying out my invention it is obvious that changes may be made without departing from the principles involved. The foregoing description is made merely for the purpose of illustrating a typical structure and no unnecessary limitations should be placed thereon, and the appended claims are to be construed as broadly as is possible in view of the prior art.

What I claim is:

1. A device of the kind described comprising a rotatable spindle, a cylindrical body mounted thereon and provided with a plurality of radial teeth adapted to engage perforations in one margin of a motion-picture film, and a guide spaced from and independent of said body for supporting and guiding the opposite margin of the film.

2. A device of the kind described comprising a rotatable spindle, a cylindrical body mounted thereon and provided with a plurality of radial teeth adapted to engage perforations in one margin of a motion-picture film, and a member adapted to support and guide the opposite margin of the film and consisting of a sleeve of substantially L-shape in section one portion of which is engaged by a surface of the film and the other portion of which is engaged by the adjacent edge of the film.

3. A device of the kind described comprising a rotatable toothed body having a cylindrical surface with which one margin of a motion-picture film engages and the teeth of which enter perforations in the adjacent portion of the film, and a member spaced from said body that supports the opposite portion of the film, said member provided with a lateral wall against which the adjacent edge of the film is engaged.

4. A device of the kind described comprising a rotatable toothed body having a cylindrical surface with which one margin of a motion picture film engages, and a flanged collar axially alined with said body that provides a support and guide for the opposite portion of the film.

5. A device of the kind described comprising a rotatable toothed body having a cylindrical surface against which one margin of a motion-picture film engages, and a stationary member spaced from the body to engage the opposite margin on the film, there being a lateral flange that affords a guide for the adjacent edge of the film.

6. A device of the kind described comprising a support, a bearing boss projected therefrom, a spindle rotatable in said boss, a rotatable toothed body mounted on said spindle beyond said boss with which one margin of a motion-picture film engages and is moved, and a flanged sleeve mounted on said boss adjacent said support which sleeve engages and guides the opposite portion of the film.

7. A film supporting and controlling device comprising a pair of co-acting members, one of said members being movable and provided with means to engage and move the film, and the other of said members being stationary and shaped to provide a support for the opposite longitudinal portion of the film and a guide for the adjacent edge thereof.

Signed at Chicago, in the county of Cook, and State of Illinois, this 5th day of May, 1929.

ALEXANDER FERDINAND VICTOR.